United States Patent
Wada et al.

(10) Patent No.: US 10,759,896 B2
(45) Date of Patent: Sep. 1, 2020

(54) METHOD FOR PRODUCING A RIGID POLYURETHANE FOAM

(71) Applicant: COVESTRO DEUTSCHLAND AG, Leverkusen (DE)

(72) Inventors: Hideki Wada, Kawanishi (JP); Takayasu Tanabe, Osaka (JP); Kenichi Sakata, Nishinomiya (JP)

(73) Assignee: Covestro Deutschland AG, Leverkusen (DE)

( * ) Notice: Subject to any disclaimer, the term of this patent is extended or adjusted under 35 U.S.C. 154(b) by 120 days.

(21) Appl. No.: 15/776,102

(22) PCT Filed: Nov. 18, 2016

(86) PCT No.: PCT/EP2016/078183
§ 371 (c)(1),
(2) Date: May 15, 2018

(87) PCT Pub. No.: WO2017/085283
PCT Pub. Date: May 26, 2017

(65) Prior Publication Data
US 2018/0327536 A1 Nov. 15, 2018

(30) Foreign Application Priority Data

Nov. 19, 2015 (JP) .................................. 2015-226853

(51) Int. Cl.
| | | |
|---|---|---|
| C08G 18/48 | (2006.01) | |
| C08G 18/40 | (2006.01) | |
| C08G 18/76 | (2006.01) | |
| C08G 65/26 | (2006.01) | |
| C08K 5/521 | (2006.01) | |
| C08L 71/02 | (2006.01) | |
| C08G 18/50 | (2006.01) | |
| C08G 101/00 | (2006.01) | |

(52) U.S. Cl.
CPC ....... *C08G 18/482* (2013.01); *C08G 18/4829* (2013.01); *C08G 18/4841* (2013.01); *C08G 18/4883* (2013.01); *C08G 18/5024* (2013.01); *C08G 18/7664* (2013.01); *C08G 65/2609* (2013.01); *C08G 65/2621* (2013.01); *C08K 5/521* (2013.01); *C08L 71/02* (2013.01); *C08G 2101/005* (2013.01); *C08G 2101/0025* (2013.01); *C08G 2101/0083* (2013.01); *C08L 2205/025* (2013.01)

(58) Field of Classification Search
CPC .............. C08G 18/482; C08G 18/4829; C08G 18/4841; C08G 18/4883; C08G 18/5024; C08G 18/7664; C08G 2101/0025; C08G 2101/005; C08G 2101/0083

See application file for complete search history.

(56) References Cited

U.S. PATENT DOCUMENTS

| | | | | |
|---|---|---|---|---|
| 5,686,500 A * | 11/1997 | Fishback | .............. | C08G 18/165 521/128 |
| 5,721,284 A * | 2/1998 | Smits | ..................... | C08J 9/0061 521/112 |
| 8,507,036 B2 | 8/2013 | Shimizu et al. | | |
| 2006/0142407 A1* | 6/2006 | Hollmann | .......... | C08G 18/7664 521/172 |
| 2007/0232712 A1* | 10/2007 | Emge | ................... | C08G 18/482 521/176 |
| 2014/0010981 A1* | 1/2014 | Grieser-Schmitz | .... | C08G 18/72 428/36.5 |
| 2016/0311962 A1* | 10/2016 | Kinoshita | .......... | C08G 18/6688 |

FOREIGN PATENT DOCUMENTS

| | | |
|---|---|---|
| JP | 5504877 B2 | 5/2014 |
| JP | 2015004011 A | 8/2015 |
| WO | 2013058341 A1 | 4/2013 |

* cited by examiner

Primary Examiner — Melissa A Rioja
(74) Attorney, Agent, or Firm — Donald R. Palladino

(57) ABSTRACT

Provided is a method for producing a light rigid urethane foam superior in moldability (cell interconnection, spraying thickness, adhesiveness, etc.), heat-insulating efficiency, and others by a spraying method, using water as foaming agent. A method for producing an open-cell polyurethane foam, comprising obtaining the open-cell polyurethane foam by mixing and reacting a polyol composition containing a polyol compound, water as a foaming agent, a foam stabilizer, a catalyst, and a flame retardant with a polyisocyanate compound by a spraying method, the polyol compound containing polyols (A), (B), and (C) at a polyol (A) content of 10 to 40 wt parts, a polyol (B) content of 10 to 70 wt parts, and a polyol (C) content of 10 to 70 wt parts.

15 Claims, No Drawings

METHOD FOR PRODUCING A RIGID POLYURETHANE FOAM

CROSS REFERENCE

This application is a national stage application under 35 U.S.C. § 371 of PCT/EP2016/078183, filed Nov. 18, 2016, which claims the benefit of Japanese Application No. 2015-226853, filed Nov. 19, 2015, both of which are being incorporated by reference herein.

FIELD

The present invention relates to a method for producing a light rigid polyurethane foam superior in cell interconnection, low density, heat-insulating efficiency, storage stability of the blended polyol raw material (polyol composition), and others by a spraying method, using only water as a foaming agent.

BACKGROUND

Foamed synthetic resins such as rigid polyurethane foams (hereinafter, also referred to simply as rigid foams) have been widely produced by reacting a polyol and a polyisocyanate and foaming the mixture in the presence of a foam stabilizer, a catalyst, and a foaming agent.

A spraying method is frequently used in production of rigid polyurethane foams that are used, for example, as a heat insulator particularly in construction sites.

The spraying method is a method of forming a heat insulator or the like by feeding a raw material liquid under high pressure, spraying the raw material liquid for example onto a wall to be coated through a spray gun, and foaming the liquid instantaneously on the wall. Various studies on the spraying method have been made to produce high-quality rigid foams (e.g., Japanese Patent No. 5504877, Re-publication of PCT International Publication No. 2013/058341, and Japanese Unexamined Patent Application Publication No. 2015-4011).

Patent Document 1 (Japanese Patent No. 5504877) teaches that, for improvement of the storage stability of a blended polyol raw material to be foamed only with water, the content of terminal oxyethylene block chains of the polyether polyol is preferably adjusted to 5 to 15 mass % in the total amount of the alkylene oxides.

Patent Document 2 (Re-publication of PCT International Publication No. 2013/058341) teaches that, for improvement of the storage stability of a blended polyol raw material to be foamed only with water, the polyether polyol preferably has random polymerization chains of oxyethylene and oxypropyl groups and the content of the oxyethylene group is preferably adjusted to 20 to 60 mass % in the total amount of the alkylene oxides.

Patent Document 3 (Japanese Unexamined Patent Application Publication No. 2015-4011) teaches that, for production of high-quality rigid foams, the amount of the Mannich polyol used is preferably adjusted to 45 to 80 wt parts.

However, the storage stability of the blended polyol raw material is still unsatisfactory and further improvement is desired. Especially, storage stability in high temperature range (e.g., 40 to 50° C.), which may be encountered in summer time, is desired.

SUMMARY

The inventors have found that, in producing a rigid polyurethane foam foamed only with water by a spraying method, it is possible to improve the storage stability of the blended polyol raw material (polyol composition) by using a polyether polyol produced by terminal ring-opening addition polymerization with ethylene oxide.

Specifically, the present application relates to the following inventions:

[1]

A method for producing an open-cell polyurethane foam, comprising obtaining the open-cell polyurethane foam by mixing and reacting a polyol composition containing a polyol compound, water as a foaming agent, a foam stabilizer, a catalyst, and a flame retardant with a polyisocyanate compound by a spraying method, the polyol compound containing polyols (A), (B), and (C), at a polyol (A) content of 10 to 40 parts by weight (hereinafter also referred to as wt parts), a polyol (B) content of 10 to 70 wt parts, and a polyol (C) content of 10 to 70 wt parts, wherein:

the polyol (A) is a Mannich polyol or an aromatic amine polyol having a hydroxyl value of 100 to 600 mg-KOH/g that is obtained by ring-opening addition polymerization of an alkylene oxide with a nitrogen atom-containing initiator having a functionality of 2 to 8;

the polyol (B) is an polyether polyol, i.e., a block polymer containing a propylene oxide block and terminal ethylene oxide blocks, having an ethylene oxide rate of 16 to 25 mass % in the total amount of alkylene oxides and a hydroxyl value of 10 to 80 mg-KOH/g that is obtained by ring-opening addition polymerization of propylene oxide with a nitrogen atom-free initiator having a functionality of 2 to 4 and subsequent ring-opening addition polymerization of ethylene oxide;

the polyol (C) is a polyether polyol having a hydroxyl value of 100 to 900 mg-KOH/g that is obtained by ring-opening addition polymerization of an alkylene oxide with a nitrogen atom-free initiator having a functionality of 2 to 8; and the content of water is 15 to 28 parts by weight with respect to 100 parts by weight of the polyol compound.

In this context, "Open-cell foam" or "open-cell polyurethane foam" shall mean, a foam with a ratio of open cells to closed cells >1. Preferably, the polyurethane foam comprises 80%, most preferably >90% open cells and <10% closed cells (with regard to the total amount of cells in the foam).

[2]

The production method according to claim 1, wherein the Mannich polyol of the polyol (A) is a polyether polyol having an ethylene oxide rate of 30 to 85 mass % in the total amount of the alkylene oxides, that is obtained by ring-opening addition polymerization of propylene oxide and ethylene oxide with a Mannich compound obtained in reaction of a phenol, an aldehyde, and an alkanolamine.

[3]

The production method according to [1] or [2], wherein the Mannich compound of the polyol (A) is prepared from 1 mole of the phenol, 1.5 to 2.0 moles of the aldehyde, and 2.3 to 3.0 moles of the alkanolamine.

[4]

The production method according to any one of [1] to [3], wherein the aromatic amine polyol of the polyol (A) is a polyether polyol obtained by ring-opening addition polymerization of propylene oxide and ethylene oxide with an aromatic amine compound, the polyether polyol having an ethylene oxide rate of 30 to 85 mass % in the total amount of the alkylene oxides and a hydroxyl value of 200 to 500 mg-KOH/g.

[5]
The production method according to any one of [1] to [4], wherein the aromatic amine compound of the polyol (A) is at least one compound selected from the group consisting of diphenylmethanediamine and tolylenediamine.

[6]
The production method according to any one of [1] to [5], wherein the alkylene oxide used in the ring-opening addition polymerization for the polyol (C) is propylene oxide without or with ethylene oxide and the rate of ethylene oxide in the total amount of propylene oxide and ethylene oxide is 0 to 20 wt %.

[7]
The production method according to any one of [1] to [6], wherein the rigid foamed synthetic resin produced has a core density of 10 to 17 kg/m$^3$.

[8]
The production method according to any one of [1] to [7], wherein the open-cell rigid polyurethane foam is obtained by mixing the polyol composition and the polyisocyanate compound at an isocyanate index of 30 to 100.

[9]
The production method according to any one of [1] to [8], wherein the polyisocyanate compound is polymeric MDI.

[10]
The production method according to any one of [1] to [9], wherein water is the only foaming agent present.

[11]
The invention also relates to the polyol composition used for the production method according to any one of [1]-[10], to the foam-forming mixture obtained by mixing the polyol composition with the polyisocyanate compound and to the rigid foams obtained by the method of any one of [1]-[10], Also, the invention relates to the use of such rigid foams in insulating applications.

It is possible according to the present invention to prepare a polyol composition superior in storage stability even when only a great amount of water is used as the foaming agent and thus to produce a rigid polyurethane foam that is superior in spray-foaming processability, light with a core density of 10 to 17 kg/m$^3$, and superior in heat-insulating efficiency, flame resistance, and others.

In the method for producing a rigid polyurethane foam according to the present invention, a rigid foamed synthetic resin is produced by reacting a polyol compound and a polyisocyanate and foaming the mixture in the presence of a foam stabilizer, a catalyst, and a foaming agent by a spraying method. Hereinafter, the details thereof will be described.

DETAILED DESCRIPTION

In the present invention, the individual high-molecular weight polyols are respectively designated as polyol (A), polyol (B), polyol (C), and other polyols and the mixture of these polyols will be called a polyol compound. In addition, a mixture of the polyol compound with a foaming agent (water), a catalyst, a foam stabilizer, a flame retardant and, as needed, other compounding ingredients will be called a "polyol composition".

The amount of the polyol compound is preferably 100 wt parts in the polyol composition, but may not be 100 wt parts. For example, the total amount of polyols (A) to (C) and other polyols, particularly the total amount of polyols (A) to (C) only, may be 100 wt parts, but may not be 100 wt parts. In a preferred embodiment, the polyol compound only consists of polyols (A) to (C).

[Polyol (A)]
The Mannich polyol of polyol (A) is a polyether polyol having an ethylene oxide rate of 30 to 85 mass %, preferably 35 wt % to 80 wt %, in the total amount of the alkylene oxides that is obtained by ring-opening addition polymerization of propylene oxide and ethylene oxide with a Mannich compound obtained by reaction of a phenol, an aldehyde, and an alkanolamine.

The Mannich compound can be obtained in reaction of a phenol, an aldehyde, and an alkanolamine. Examples of the phenol include phenol, nonylphenol, cresol, bisphenol A, resorcinol, and the like. Among the phenols above, nonylphenol is preferable, as it improves the compatibility between the polyol and the isocyanate and thus improves the appearance of the cells. Examples of the aldehyde include formaldehyde, paraformaldehyde, and the like and formaldehyde is preferable, as it improves the adhesiveness of the foam. Examples of the alkanolamine include monoethanolamine, diethanolamine, triethanolamine, 1-amino-2-propanol, aminoethylethanolamine, and the like. Among the amines above, diethanolamine is preferable in terms of the balance between improvement in the strength of the foam and reduction of the viscosity of the polyol.

In producing the Mannich compound, the rates of the raw materials are preferably the followings: 1 mole of a phenol, 1.5 to 2.0 moles of an aldehyde and 2.3 to 3.0 moles of an alkanolamine. When the ratio of the aldehyde to the phenol is in the range above, no odor is generated when the rigid foam is produced. Alternatively when the ratio of the aldehyde to the phenol is in the range above, the polyol (A) has favorable viscosity and the rigid foam obtained shows favorable adhesiveness. When the ratio of the alkanolamine to the aldehyde is in the range above, the rigid foam obtained favorably shows smaller shrinkage. Alternatively when the ratio of the alkanolamine to the aldehyde is in the range above, the polyol (A) has favorable viscosity and no odor is generated in production of the rigid foam.

The aromatic amine polyol of polyol (A) is a polyether polyol obtained by ring-opening addition polymerization of propylene oxide and ethylene oxide with an aromatic amine compound that has an ethylene oxide rate of 30 to 85 mass %, preferably 35 wt % to 80 wt % in the total amount of the alkylene oxides.

Examples of the aromatic amine compound include diphenylmethanediamine, tolylenediamine, xylenediamine, isophoronediamine, hexamethylenediamine, and the like. Among the aromatic amine compounds above, diphenylmethanediamine and tolylenediamine are favorable, as they improve the combustibility and the heat conductivity of the polyurethane.

The polyol (A) has a hydroxyl value of 100 to 600 mg-KOH/g, preferably 200 to 500 mg-KOH/g.

The alkylene oxide used in production of polyol (A) is a mixture of propylene oxide and ethylene oxide. The rate of ethylene oxide in the total amount of the alkylene oxides is 30 to 85 wt %, preferably 35 wt % to 80 wt %. When ethylene oxide is used, most of the hydroxyl groups in polyol (A) become primary hydroxyl groups, increasing the reactivity of polyol (A) and the reactivity with isocyanates and thus making it more favorable in spraying application. It is simultaneously effective in improving the adhesiveness of the rigid foam obtained.

Unfavorably when the ethylene oxide rate is greater than the rate above, the rigid foam obtained shows lower compression strength and, as a result, becomes more vulnerable to shrinkage. Also unfavorably when the ethylene oxide rate is lower than the rate above, polyol (A) becomes more viscous and the rigid foam obtained becomes less adhesive. When the ethylene oxide rate is in the range above, the polyol (A) and water, which is used as the foaming agent, show improved compatibility and the raw materials containing isocyanates are mixed well, effectively giving a rigid foam improved in appearance and mechanical properties.

The content of polyol (A) is 10 to 40 wt parts, for example 15 to 35 wt parts. When the polyol (A) content is more than 40 wt parts, the foam obtained has harder surface, making it resistant to cutting for example with a wave knife during application on the construction site and leading to elongation of the construction period. Alternatively when it is less than 10 wt parts, the foam obtained shows reduced combustibility.

[Polyol (B)]

Polyol (B) is a polyether polyol obtained by ring-opening addition polymerization of propylene oxide with a nitrogen atom-free initiator having a functionality of 2 to 4 and subsequent terminal ring-opening addition polymerization of ethylene oxide. Polyol (B) is a block polymer polyether polyol containing both propylene oxide block and ethylene oxide block. The ethylene oxide rate is 16 to 25 mass %, for example 17 to 22 wt parts, in the total amount of the alkylene oxides (preferably, in the total amount of propylene oxide and ethylene oxide).

Polyol (B) has a hydroxyl value of 10 to 80 mg-KOH/g, preferably 20 to 55 mg-KOH/g.

The amount of polyol (B) is 10 to 70 wt parts, preferably 20 to 60 wt parts, more preferably 30 to 50 wt parts. When the amount of polyol (B) is in the range above, the rigid foam obtained has a favorably communicative cell structure and retains favorable other flame-resisting properties without deterioration. When the amount of polyol (B) is smaller than the range above, the cells in the rigid foam become closed in a greater amount, generating problems such as shrinkage. Alternatively when it is greater than the range above, the foam obtained show deterioration in crosslinking degree and reaction rate, leading to reduction in foam volume (so-called back shot) after gas removal, making it more vulnerable to hardness reduction and cell roughening, and leading to deterioration in combustibility.

[Polyol (C)]

The nitrogen atom-free initiator is preferably a polyvalent alcohol, particularly a 2- to 6-valent alcohol. Typical examples of the polyvalent alcohol include ethylene glycol, propylene glycol, glycerol, trimethylolpropane, diethylene glycol, diglycerin, pentaerythritol, sorbitol, sucrose, and the like. The initiator may be a single compound or two or more compounds used in combination.

Examples of the alkylene oxide used in production of polyol (C) include ethylene oxide, propylene oxide, 1,2-epoxybutane, 2,3-epoxybutane, styrene oxide, and the like. Among the compounds above, propylene oxide alone is preferably used. Use of ethylene oxide is unfavorable, as it leads to reduction of the compression strength of the rigid foam obtained and, as a result, makes the rigid foam obtained more vulnerable to shrinkage.

Polyol (C) has a hydroxyl value of 100 to 900 mg-KOH/g, preferably 200 to 500 mg-KOH/g, more preferably 200 to 500 mg-KOH/g, further more preferably 300 to 500 mg-KOH/g, and particularly preferably 350 to 450 mg-KOH/g. When the polyol (C) has a hydroxyl value of 200 to 500 mg-KOH/g, the reaction rate is higher, there is no reduction in foam volume (so-called back shot) after gas removal, the gas is removed favorably, and the foam obtained is resistant to shrinkage.

The amount of polyol (C) is 10 to 70 wt parts, preferably 15 to 60 wt parts, more preferably 20 to 40 wt parts. When the polyol (C) content is not smaller than 40 wt parts, the rigid foam obtained tends to have favorable strength and favorable foam surface smoothness. When the polyol (C) content is not greater than 10 wt parts, the rigid foam obtained tends to have open cells, preferably leading to favorable dimensional stability.

[Other Polyol]

A polyol other than polyols (A) to (C) may be used. Alternatively, a polyvalent phenol or an aminated polyol may be used.

The amount of the other polyol may be 20 wt parts or less, for example 0.1 to 15 wt parts.

[Foaming Agent]

In the present invention, only water is used as the foaming agent. The amount of water as the foaming agent is 15 to 28 wt parts, preferably 16 to 25 wt parts, particularly preferably 17 to 20 wt parts, with respect to 100 wt parts of the polyol compound. When the water content is less than 15 wt parts, the rigid foam obtained unfavorably becomes heavier. In addition, when it is more than 28 wt parts, the polyol composition readily unfavorably shows deterioration in storage stability.

[Polyisocyanate]

The polyisocyanate compound used in the present invention is an aromatic, alicyclic, aliphatic, or other polyisocyanate having 2 or more isocyanate groups. Typical examples thereof include polyisocyanates such as tolylene diisocyanate (TDI), diphenylmethane diisocyanate (MDI), polymethylene polyphenyl isocyanates (common name: polymeric MDIs), xylylene diisocyanate (XDI), isophorone diisocyanate and hexamethylene diisocyanate (HMDI); the prepolymer-type derivatives, isocyanurate-modified derivatives, urea-modified derivatives, and carbodiimide-modified derivatives thereof; and the like. Some of these polyisocyanates may be used in combination. In particular, a polymeric MDI is preferable.

The polyisocyanate preferably has a viscosity of 50 to 400 mPa·s at 25° C. When the viscosity is in the range above, the rigid foam obtained unfavorably becomes more vulnerable to shrinkage. Also when the viscosity is more than 400 mPa·s, the raw materials are mixed less effectively during application by a spraying method, often unfavorably resulting in poor appearance of the rigid foam obtained.

The amount of the polyisocyanate used is preferably 30 to 100, as expressed by isocyanate index (a number obtained by multiplying the rate of isocyanate groups to the total number of the active hydrogen atoms of the polyol, water, and other active hydrogen compounds in the polyol composition by 100). It is particularly preferably 45 to 65. When it is 30 to 100, there emerged no problems such as lower hardness and shrinkage, and thus the reactivity is high and the density is appropriate.

[Catalyst]

In production methods for a rigid polyurethane foam using only water as the foaming agent, wherein the initial foaming efficiency is lower, an amine catalyst or a lead compound such as lead octanoate is used as the catalyst to keep the reactivity higher than before. However, amine catalysts, which generally have high volatility, can cause health problems when spraying the formulation, such as eye rainbow (blurred vision), and lead compounds, which have high toxicity, demand sufficient caution in handling as well. Thus, for improvement of working environment, it is preferable not to use these catalysts.

A known method of suppressing the eye rainbow phenomenon of amine catalysts is to use a reactive amine catalyst containing isocyanate-reactive active hydrogen groups in the molecule. Also proposed was a method of using a bismuth compound replacing lead compound. However, common reactive amine catalysts and bismuth compounds, which have insufficient initial foaming efficiency, caused problems such as deterioration in moldability.

Characteristically, polyol (A) according to the present invention, which contains nitrogen elements and also many ethylene oxide components, is inherently higher in reactivity for resin production. Thus, it has an advantage that it is possible to reduce the amount of the catalyst used and to use favorably a reactive amine catalyst slightly lower in catalytic activity.

Accordingly, the catalyst favorable in the present invention is a reactive amine catalyst having one or more isocyanate-reactive active hydrogen groups in the molecule. A more favorable catalyst is a reactive amine catalyst having higher foaming activity. It is possible by using the catalyst properly to improve cell interconnection, reduce density, and improve spray-foaming processability (spraying thickness, drawdown).

Examples thereof include 2-[[2-(Dimethylamino)ethyl]methylamino]ethanol, N,N-dimethylaminoethoxy ethanol, N,N,N'-trimethyl-N'-hydroxyethyl-bisaminoethylether, and the like. Some of these catalysts may be used in combination. In addition, these catalysts may be used in combination with a catalyst other than those above.

The amount of the catalyst is preferably 3 to 15 wt parts with respect to 100 wt parts of the polyol compound.

[Foam Stabilizer]

In the present invention, a foam stabilizer is used for production of favorable cells. Examples of the foam stabilizer include silicone-based foam stabilizers and fluorine-containing compound-based foam stabilizers. A bubble-breaking foam stabilizer may also be used. The amount of these foam stabilizers may be determined arbitrarily, but is preferably 0.1 to 10 wt parts with respect to 100 wt parts of the polyol compound.

Commercially available foam stabilizers include B8002, B4900 (from Evonik Degussa Japan), and the like. The foam stabilizer may be a single compound or a mixture of at least two compounds.

[Flame Retardant]

In the present invention, a flame retardant is used. The flame retardant is preferably a phosphorus-based flame retardant and the typical favorable compounds include tricresyl phosphate (TCP), triethyl phosphate (TEP), tris(β-chloroethyl) phosphate (TCEP), tris(β-chloropropyl) phosphate (TCPP), and the like.

The amount of the flame retardant used is preferably 10 to 80 wt parts, more preferably 20 to 60 wt parts with respect to 100 wt parts of the polyol compound.

When the amount of the flame retardant is more than the lower limit value of the range, the foam obtained shows favorably improved flame resistance. When it is not higher than the upper limit value of the range, the polyol system liquid is likely to have favorable storage stability. The flame retardant used may be a single compound, or two or more compounds may be used as mixed.

[Other Compounding Ingredients]

In the present invention, any other compounding ingredients may be used in addition to the polyol, polyisocyanate, foaming agent, catalyst, foam stabilizer, and flame retardant described above. Examples of the compounding ingredients include fillers such as calcium carbonate and barium sulfate; aging inhibitors such as antioxidants and ultraviolet absorbents; plasticizers, colorants, antifungal agents, foam breakers, dispersants, discoloration inhibitors, and the like.

[Spraying Method]

The method for producing a rigid foam according to the present invention is a spraying method. There are many available known foam-producing methods by the spraying method, however, an air-less spray foaming method of mixing and foaming a blend liquid in a mixing head is preferable, although the favorable method is not limited thereto. The spray foaming is a foaming method of reacting a polyol composition and a polyisocyanate compound by spraying, characterized in that the reaction can be terminated in a short period of time by proper selection for example of a catalyst. The spray foaming method is often employed at construction sites in forming a rigid foam heat insulator on walls, ceilings, and others. The spray foaming method, which produces a rigid foam directly at the work sites, has advantages for example that it is possible to reduce application cost and form a rigid foam continuously even on an irregular-surfaced application plane.

The rigid foam prepared by the production method according to the present invention preferably has a density of 10 to 17 kg/m$^3$. It is possible to reduce the density by using water as the foaming agent in a greater amount, but use of the large amount of the foaming agent makes the rigid foam obtained readily shrinkable.

It is possible according to the present invention to produce an open-cell rigid foam by spraying method using only water as the foaming agent. Although much water is contained, the polyol blend composition shows favorable storage stability and favorable miscibility with the isocyanate compound, and thus it is possible to reduce the weight of the rigid foam, using water in a greater amount. The rigid foam obtained has fine and smooth cells and thus has favorable dimensional stability and strength. It is also possible by the spraying method to form a low-density rigid foam layer superior in moldability (spraying thickness, drawdown, etc.).

[Testing Methods]

Hydroxyl values are determined according to JIS K1557-1:2007 (corresponding to ISO 14900:2001).

Viscosities are determined according to JIS K1557-5:2007 (corresponding to ISO 2555:1989).

Foam densities are determined according to JIS K 7222:2005 (corresponding to ISO 845:1988).

Heat conductivity (unit: mW/m-K (23° C.)) is determined according to JIS A 1412-2:1999 (corresponding to ISO 8301:1999).

EXAMPLES

Hereinafter, the present invention will be described specifically with reference to Examples, but the present invention is not limited to these Examples. The numerical values used herein are indicated by parts by weight, unless specified otherwise.

Hydroxyl value was determined according to JIS K1557-1 (2007).

Viscosity was determined according to JIS K1557-5 (2007).

Examples 1 to 4 and Comparative Example 1

A polyol composition containing a polyol compound, water as a foaming agent, a foam stabilizer, catalysts, and a flame retardant and a polyisocyanate compound were mixed and reacted with each other by a hand-foaming or spray foaming method, to give a polyurethane foam. A rigid foam (polyurethane foam) was prepared in the composition shown in Table 1.

Raw materials used in the Examples and the Comparative Example were as follows:

[Polyols]

Polyol A1: One mole of nonylphenol, 1.6 moles of formaldehyde, and 2.4 moles of diethanolamine were allowed to react with each other, to give a Mannich compound 1. Propylene oxide (PO) and ethylene oxide (EO) were bonded to the Mannich compound 1 in that order by ring-opening addition polymerization, to give a Mannich polyol having a viscosity of 800 mPa·s at 25° C. and a hydroxyl value of 300 mg-KOH/g. The rate of EO in the total amount of PO and EO then was 61 wt %.

Polyol B1: Glycerol was used as the initiator; propylene oxide (PO) and ethylene oxide (EO) were bonded thereto in that order by ring-opening addition polymerization, to give a polyether polyol having a viscosity of 830 mPa·s at 25° C. and a hydroxyl value of 35 mg-KOH/g. The rate of EO in the total amount of PO and EO then was 13 wt %.

Polyol B2: Glycerol was used as the initiator; propylene oxide (PO) and ethylene oxide (EO) were bonded thereto in that order by ring-opening addition polymerization, to give a polyether polyol having a viscosity of 1200 mPa·s at 25° C. and a hydroxyl value of 28 mg-KOH/g. The rate of EO in the total amount of PO and EO then was 17 wt %.

Polyol B3: Glycerol was used as the initiator; propylene oxide (PO) and ethylene oxide (EO) were bonded thereto in that order by ring-opening addition polymerization, to give a polyether polyol having a viscosity of 1150 mPa·s at 25° C. and a hydroxyl value of 28 mg-KOH/g. The rate of EO in the total amount of PO and EO then was 22 wt %.

Polyol C1: Glycerol was used as the initiator; only propylene oxide was bonded thereto by ring-opening addition polymerization, to give a polyether polyol having a viscosity of 250 mPa·s at 25° C. and a hydroxyl value of 235 mg-KOH/g.

Polyol C2: A mixture of sucrose, propylene glycol, and water (wt. ratio of 90:5.7:4.3) was used as the initiator; only propylene oxide was bonded thereto by ring-opening addition polymerization, to give a polyether polyol having a viscosity of 12000 mPa·s at 25° C. and a hydroxyl value of 380 mg-KOH/g.

[Foaming Agent]

Water was used.

[Catalysts]

Catalyst 1: 2-[[2-(Dimethylamino)ethyl]methylamino]ethanol

Catalyst 2: N,N-dimethylaminoethoxy ethanol

Catalyst 3: N,N,N'-trimethyl-N'-hydroxyethyl-bisaminoethylether

[Foam Stabilizer]

Foam stabilizer 1: Product name: B8002, produced by Evonik Degussa Japan

[Flame Retardant]

Tris (2-chloropropyl) phosphate (product name: TMCPP, produced by Daihachi Chemical Industry Co., Ltd.)

[Isocyanate Compound]

Polymeric MDI, product name: Sumidur 44V20L (produced by Sumika Covestro Urethane Co., Ltd.), viscosity (25° C.): 180 mPa·s, NCO content: 31.5%

TABLE 1

|  |  | Comparative Example 1 | Example 1 | Example 2 | Example 3 | Example 4 |
|---|---|---|---|---|---|---|
| Polyol composition | A1 | 20 | 20 | 20 | 20 | 20 |
|  | B1 | 41 |  |  |  |  |
|  | B2 |  | 41 |  |  |  |
|  | B3 |  |  | 41 | 30 | 50 |
|  | C1 | 9 | 9 |  | 20 | 10 |
|  | C2 | 30 | 30 | 30 | 30 | 20 |
|  | Water | 19 | 19 | 19 | 19 | 19 |
|  | Catalyst 1 | 5 | 5 | 5 | 5 | 5 |
|  | Catalyst 2 | 5 | 5 | 5 | 5 | 5 |
|  | Catalyst 3 | 3 | 3 | 3 | 3 | 3 |
|  | Foam stabilizer 1 | 2 | 2 | 2 | 2 | 2 |
|  | Flame retardant | 40 | 40 | 40 | 40 | 40 |
| Blending ratio |  | volume ratio | volume ratio | volume ratio | volume ratio | volume ratio |
| Polyol composition:Polymeric MDI |  | 1:1 | 1:1 | 1:1 | 1:1 | 1:1 |
| Hand foaming Reactivity |  |  |  |  |  |  |
| Cream time | second | 5 | 5 | 4 | 4 | 4 |
| Gel time | second | 9 | 9 | 8 | 8 | 8 |
| Rise time | second | 12 | 12 | 11 | 11 | 10 |
| Core density | kg/m3 | 12 | 12 | 12 | 12 | 12 |
| Machine foaming Reactivity |  |  |  |  |  |  |
| Cream time | second | 1.8 | n.d | 1.7 | 1.8 | 1.9 |
| Rise time | second | 6.0 | n.d | 6.0 | 6.1 | 5.2 |
| Core density | kg/m3 | 12 | 12 | 12.8 | 12.5 | 13.6 |
| Storage stability |  | x | ○ | ○ | ○ | ○ |
| Storage at 40° C. | day | 45 | 60 | 90 | 70 | n.d |
| Storage at 50° C. | day | 14 | 20 | 30 | 23 | 40 |
| Storage at 70° C. | day | 2 | 2.5 | 4 | 3 | 5 |
| Physical properties |  |  |  |  |  |  |
| Heat-insulating efficiency | mW/m · K | 36 | 35 | 34 | 36 | 35 |
| Combustibility |  | ○ | ○ | ○ | ○ | ○ |
| Shrinkage |  | ○ | ○ | ○ | ○ | ○ |

Note)
n.d: not determined

Tests were performed by the methods described below. The results are summarized in Table 1.

<Evaluation of the Storage Stability of Polyol Composition>

One of the polyol compositions was placed in test tubes; respective test tube was stored under temperature conditions of 40° C., 50° C., and 70° C.; and the period from the start of the test to the time when the polyol composition separated was determined. Polyol compositions that did not separate after storage for two months or more at 40° C. were indicated by ○ (favorable) and those that separated by x (unfavorable).

<Preparation by Hand Foaming and Evaluation>

Water, a foam stabilizer, catalysts, and a flame retardant were added to a polyol compound in the composition shown in Table 1, to give a polyol composition. 55 g (calculated, assuming that the density was 1.09 g/cm$^3$) of a polyol composition prepared from a polyol composition and a polyisocyanate compound at a volume ratio of 1:1 and 62 g (calculated, assuming that the density was 1.23 g/cm$^3$) of a polyisocyanate compound were placed in a 300-cm$^3$ cup at a liquid temperature of 15° C.; the mixture was stirred for 2 seconds for reaction by an agitating apparatus, a drilling machine equipped with an agitating blade, at a rotational frequency of 5000 rpm; the resulting mixture was poured into an open-top wood box with a size of 150 mm of length, 200 mm of width, and 150 mm of height, to give a rigid foam. The hydroxyl value (excluding water) and the isocyanate index of the polyol composition are shown in Table 1.

<Cream Time, Gel Time, and Rise Time>

For evaluation of reactivity, the following items were determined by visual observation:
cream time: period from the time when the polyol system liquid and the polyisocyanate compound were first mixed (zero second) to the time when the mixture began to change in color tone and to foam;
gel time: period from start of mixing to the time when, if a wooden chopstick is inserted into and then pulled out of the reaction mixture, the reaction mixture deposited on the chopstick appears stringy. Frequency of insertion ~1 time per second.
rise time: period until the time when the expansion of the foam by foaming stopped (unit: second).

<Density>

A cubic sample, 100 mm each side, was cut off from the core region of the foam obtained and the density thereof was determined according to JIS K 7222:2005. Those samples that showed large shrinkage deformation, which did not permit density measurement, were indicated by "n.d." in the Table.

<Preparation by Spraying Method and Evaluation>

A rigid foam was prepared according to JIS-A-9526 by spraying a polyol composition and a polyisocyanate compound similarly to the preparation by hand foaming above onto a vertically placed plywood (assumed as wall) at a liquid temperature of 40° C., a room temperature of 20° C., and a volume ratio of 1:1, using a spray foaming machine.

The spray foaming machine used was Reactor E-20 manufactured by Graco Inc. and the spray gun used was Fusion Gun (chamber size 4242) manufactured by Graco Inc.

In the following tests, foams that did not permit measurement by shrinkage deformation were indicated by "n.d." in the Table. In addition, the compositions that gave unsatisfactory result in the <preparation by hand foaming and evaluation> were not subjected to the <Preparation by spraying method and evaluation>.

<Density>

A rectangular foam sample with a size of 200 mm×200 mm×25 mm was cut off from the core region and the density thereof was determined according to JIS K7222:2005.

<Heat Conductivity (Heat-insulating Efficiency)>

Heat conductivity (unit: mW/m–K (23° C.)) was determined according to JIS A 1412-2, using a heat conductivity analyzer (product name: AutoΛ HC-074 (200) model, manufactured by EKO Instruments Co., Ltd.).

<Combustion Test (Flame Resistance)>

The rigid foam obtained was subjected to the self-extinguishing test according to the test method B of JIS-A-9511 and those having a burning time of 2 minutes or less and a combustion length of 60 mm or less were indicated by ○ and those that did not satisfy the requirements by x.

<Shrinkage>

In evaluation of shrinkage, a bamboo skewer was inserted into the foam immediately after spraying, marking the position where the expansion of the foam stopped. After storage at 20° C. for one day, the position of the foam was marked and the difference from the mark on the previous day was determined. Those samples having a difference of 11 mm or more were indicated by x (unfavorable) and those having a difference of 10 mm or less were indicated by ○ (favorable). Those showing a shrinkage of 11 mm or more are likely to separate at the spray application site.

The results shown in Table 1 show that the polyol compositions of Examples 1, 2, 3, and 4 according to the present invention are superior in storage stability and also in combustibility and shrinkage.

In contrast, in Comparative Example 1, wherein the polyol B1 did not satisfy the requirement of the present invention and it contained a smaller amount of ethylene oxide, the polyol composition caused a problem of unfavorable storage stability.

The polyol composition according to the present invention shows favorable storage stability even if it contains much water and enables production of an open-cell rigid foam by a spraying method using only water as the foaming agent. The rigid foam obtained is light and satisfies the performance demanded for heat insulators. It is also superior in foaming processability and the hygiene of working environment by the spraying method and is thus favorably used in construction and building material applications.

The invention claimed is:

1. A polyol composition for producing an open-cell rigid polyurethane foam, comprising:
   (1) a polyol mixture comprising:
      (A) 10 to 40 parts by weight of a Mannich polyol or an aromatic amine polyol having a hydroxyl value of 100 to 600 mg-KOH/g that is a ring-opening addition polymerization product of an alkylene oxide with a nitrogen atom-containing initiator having a functionality of 2 to 8;
      (B) 10 to 70 parts by weight of a polyether polyol that has a hydroxyl value of 10 to 80 mg-KOH/g and is a block polymer containing a block derived from propylene oxide and terminal blocks derived from ethylene oxide, wherein the polyether polyol is prepared from an alkylene oxide component comprising propylene oxide and ethylene oxide in an amount of 17 to 25 mass %, based on the total mass of the alkylene oxide component, and wherein the polyether polyol is a ring-opening addition polymerization product of propylene oxide with a nitrogen atom-free initiator having a functionality of 2 to 4 with subsequent ring-opening addition polymerization of ethylene oxide; and (C) 10 to 70 parts by weight of a polyether polyol having a hydroxyl value of 100 to 900 mg-KOH/g that is a ring-opening addition polymerization product of an alkylene oxide with a nitrogen atom-free initiator having a functionality of 2 to 8;

(2) a foaming agent comprising water, wherein the water is present in an amount of 15 to 28 parts by weight, based on 100 parts by weight of the polyol mixture;

(3) a foam stabilizer;

(4) a catalyst; and (5) a flame retardant.

2. The polyol composition of claim 1, wherein the Mannich polyol is a polyether polyol having an ethylene oxide content of 30 to 85 mass % based on the total amount of the alkylene oxide and is a ring-opening addition polymerization product of propylene oxide and ethylene oxide with a Mannich compound that is a reaction product of a phenol, an aldehyde, and an alkanolamine.

3. The polyol composition of claim 2, wherein the Mannich compound is the reaction product of 1 mole of the phenol, 1.5 to 2.0 moles of the aldehyde, and 2.3 to 3.0 moles of the alkanolamine.

4. The polyol composition of claim 1, wherein the aromatic amine polyol is a polyether polyol that is a ring-opening addition polymerization product of propylene oxide and ethylene oxide with an aromatic amine compound, the polyether polyol having an ethylene oxide content of 30 to 85 mass %, based on the total amount of the alkylene oxide, and a hydroxyl value of 200 to 500 mg-KOH/g.

5. The polyol composition of claim 4, wherein the aromatic amine compound is at least one compound selected from the group consisting of diphenylmethanediamine and tolylenediamine.

6. The polyol composition of claim 1, wherein the alkylene oxide used in the ring-opening addition polymerization for the polyether polyol having a hydroxyl value of 100 to 900 mg-KOH/g is propylene oxide without or with ethylene oxide and the amount of ethylene oxide in the total amount of propylene oxide and ethylene oxide is 0 to 20 percent by weight.

7. The polyol composition of claim 1, wherein water is the only foaming agent present.

8. A method for producing an open-cell rigid polyurethane foam, comprising mixing and reacting the polyol composition of claim 1 with a polyisocyanate compound and spraying the mixture on a substrate.

9. The method of claim 8, wherein the rigid polyurethane foam produced has a core density of 10 to 17 kg/m$^3$, determined according to JIS K7222:2005.

10. The method of claim 8, wherein the open-cell rigid polyurethane foam is obtained by mixing the polyol composition and the polyisocyanate compound at an isocyanate index of 30 to 100.

11. The method of claim 8, wherein the polyisocyanate compound is polymeric MDI.

12. A rigid polyurethane foam produced by the method of claim 8.

13. An insulating material comprising the rigid polyurethane foam of claim 12.

14. The polyol composition of claim 1, wherein the polyether polyol that is a block polymer containing a block derived from propylene oxide and terminal blocks derived from ethylene oxide is prepared from an alkylene oxide component comprising propylene oxide and ethylene oxide in an amount of 17 to 22 mass %, based on the total mass of the alkylene oxide component.

15. The polyol composition of claim 1, wherein the polyether polyol having a hydroxyl value of 100 to 900 mg-KOH/g that is a ring-opening addition polymerization product of an alkylene oxide with a nitrogen atom-free initiator having a functionality of 2 to 8 is present in an amount of 10 to 40 parts by weight, based on the total weight of the polyol mixture.

* * * * *